United States Patent
Opitsch

(10) Patent No.: US 12,415,595 B2
(45) Date of Patent: Sep. 16, 2025

(54) FLOATING UNIT FOR LIFTING A BENDABLE CONNECTION ELEMENT AND SUPPLY SYSTEM FOR A FLOATING UNIT

(71) Applicant: AGCO International GmbH, Neuhausen (CH)

(72) Inventor: Bernd Opitsch, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 108 days.

(21) Appl. No.: 18/185,144

(22) Filed: Mar. 16, 2023

(65) Prior Publication Data
US 2023/0331366 A1    Oct. 19, 2023

(30) Foreign Application Priority Data
Apr. 13, 2022 (GB) ..................... 2205519

(51) Int. Cl.
*B64B 1/66* (2006.01)
*B64B 1/50* (2006.01)
*A01B 76/00* (2006.01)
*B64U 10/00* (2023.01)
*B64U 101/00* (2023.01)

(52) U.S. Cl.
CPC ............. *B64B 1/66* (2013.01); *B64B 1/50* (2013.01); *A01B 76/00* (2013.01); *B64U 10/00* (2023.01); *B64U 2101/00* (2023.01)

(58) Field of Classification Search
CPC ............. B64U 10/00; B64U 2101/00; B64U 2101/40; B64U 2101/45; B64U 10/30; B64U 10/60; B64U 70/93; B64U 2201/202; B64U 39/022; B64U 2101/202; B64U 1/50; B64B 1/66; B64B 1/50; A01B 76/00; B64C 39/022
See application file for complete search history.

(56) References Cited

U.S. PATENT DOCUMENTS

| | | | |
|---|---|---|---|
| 3,216,466 A * | 11/1965 | Simko | B64B 1/62 |
| | | | 285/104 |
| 9,387,928 B1 * | 7/2016 | Gentry | G05D 1/102 |
| 2008/0265086 A1 * | 10/2008 | Lee | B64B 1/50 |
| | | | 244/30 |
| 2014/0012433 A1 * | 1/2014 | Vojtech | B64B 1/54 |
| | | | 244/96 |
| 2016/0307448 A1 | 10/2016 | Salnikov et al. | |

(Continued)

FOREIGN PATENT DOCUMENTS

| | | | |
|---|---|---|---|
| DE | 102016202627 A1 | 8/2017 | |
| EP | 3578031 A1 | 12/2019 | |
| GB | 2039120 A * | 7/1980 | B63C 9/20 |

OTHER PUBLICATIONS

UK Intellectual Property Office, Search report for related UK Application No. GB2205519.8, dated Oct. 10, 2022, xx pages.

*Primary Examiner* — Joshua D Huson
*Assistant Examiner* — Vicente Rodriguez

(57) ABSTRACT

A floating unit and a supply system for a floating unit having a bendable connection element and a platform. The platform includes at least one connection point for storing the at least one floating unit. The at least one connection point includes an additional interface for connecting a first interface of the at least one floating unit wherein the bendable connection element is threaded through the clamping unit of the at least one floating unit.

15 Claims, 5 Drawing Sheets

(56) References Cited

U.S. PATENT DOCUMENTS

| | | | |
|---|---|---|---|
| 2017/0043872 A1* | 2/2017 | Whitaker | B64C 27/00 |
| 2017/0113816 A1* | 4/2017 | High | B64F 1/00 |
| 2019/0106212 A1* | 4/2019 | Furukawa | B65H 75/4484 |
| 2023/0312146 A1* | 10/2023 | Kinoshita | B64U 10/60 |
| | | | 244/114 R |

* cited by examiner

FLOATING UNIT FOR LIFTING A BENDABLE CONNECTION ELEMENT AND SUPPLY SYSTEM FOR A FLOATING UNIT

FIELD

The present disclosure relates generally to a floating unit for lifting a bendable connection element such as a wire and a supply system for storing and supplying the floating unit.

BACKGROUND

DE 10 2016 202 627 A1 discloses an arrangement with an aerial vehicle connected by a wire to an agricultural vehicle. The wire can be used to supply the aerial vehicle with electrical energy or to exchange data between the aerial vehicle and the agricultural vehicle. The aerial vehicle has rotors to fly. The rotational speed of the rotors can be adjusted to a pulling force in the wire. The more distant the aerial vehicle is flying away from the agricultural vehicle the longer is the free length of the wire between the aerial vehicle and the agricultural vehicle. Analogously, the pulling force in the wire rises with the free length of the wire. Since the pulling force acts on the aerial vehicle the pulling force may cause a side drift of the aerial vehicle which must be compensated by actively driving the propulsion system of the aerial vehicle to keep position. This results in a higher energy consumption which increases with the length of the wire.

BRIEF SUMMARY

It is an objective to provide means for a system with a vehicle connected to a bendable connection element such as a wire being configured to mitigate the pulling force in a bendable connection element to reduce the energy consumption caused by the pulling force.

According to an aspect of the invention there is provided a floating unit for lifting a bendable connection element having a clamping unit switchable between a fixed state for attaching the floating unit to the bendable connection element and a released state for detaching the floating unit from the bendable connection element and an envelope for enclosing a gas volume. The clamping unit has a first interface.

The first interface may be used to provide the floating unit with energy or any working fluid for driving or operating the floating unit.

The floating unit may include a conduit. The first interface may include a first fluidic interface. The conduit may be connected with the first fluidic interface and the envelope for supplying the gas volume with a fluid.

The fluid may be a medium having a density smaller than the medium the floating unit is floating as. Thus, the gas volume of the floating unit generates a lifting effect that lets the floating unit floating up in a medium such as air or water. Since the at least one floating unit is attachable to the bendable connection element the lifting effect can be adapted to the pulling force in the bendable connection element. The lifting effect can be raised if a floating unit is (additionally) attached to the bendable connection element or if the gas volume is increased. The lifting effect may be reduced if a floating unit is detached from the bendable connection element or if the gas volume is decreased. The gas volume may be changed by introducing or releasing of fluid in the envelope through the conduit and the first fluidic interface. Additionally, the number of floating units attached to the bendable connection element may be adapted to the pulling force of the bendable connection element.

The bendable connection element may be a wire for supplying a vehicle connected with the bendable connection element, as for example the floating unit or an additional vehicle such as a drone, with electrical energy and/or for exchanging data with the vehicle. The data may comprise control instructions to control the vehicle or sensor data generated by the vehicle. The at least one floating unit may float in the air to carry the bendable connection element in the air or may float on a surface of water to carry the bendable connection element in the water. Thus, the at least one floating unit has a lifting effect contrary to the weight force of the bendable connection element resulting in at least a partly compensation of the weight force and consequently in a mitigation of the pulling force in the bendable connection element.

The first fluidic interface may include a check valve having a seat and a closing member being moveable towards the seat for sealing the seat.

The check valve may block a reverse flow of the fluid in the envelope out of the fluidic interface. The pressure within the envelope may press the closing member against the seat so that no fluid may flow out of the fluidic interface. The closing member may be of different types such as a ball for example so that the check valve may be designed as a ball check valve.

The check valve may include a valve spring for biasing the closing member towards the seat.

Hence, the spring force of the valve spring may press the closing member against the seat in addition to the pressure of the fluid in the envelope. The spring force may be adjusted to a minimum force to be overcome before fluid may be introduced into the envelope.

The first interface may include a first electrical interface. The clamping unit may include an actuator connected with first electrical interface for supplying the actuator with electrical energy.

The actuator may be configured to switch the clamping unit into the released state when the actuator is energized with electrical energy and to switch the clamping unit into the fixed state when the actuator is deenergized.

The actuator may be a combination of a solenoid and a mechanical spring. In the fixed state, the spring may press against the bendable connection element and thus cause a friction force for clamping the clamping unit to the bendable connection element. In the released state, the solenoid may be energized and may retract the mechanical spring back from the bendable connection element. Thus, the clamping unit can switch automatically into the fixed state in case of a loss of electric energy due to the spring force. The clamping unit may comprise for example a battery to provide the electrical energy needed for the clamping unit. The actuator may be of any other type, for example an electrical motor.

The first electrical interface may be connectable with an energy source supplying the electrical energy. The first electrical interface may be an inductive interface for a contactless transfer of electrical energy. Alternatively, the first electrical interface may comprise a connector, a plug or pins for a mechanical connection with an energy source or another electrical interface. The first electrical interface may be connected with the actuator to control or supply the actuator with electrical energy.

A further aspect provides a supply system for a floating unit including at least one floating unit, a bendable connection element and a platform. The platform includes at least one connection point for the at least one floating unit. The connection point includes at least one additional interface for connecting the first interface of the at least one floating unit when the clamping unit of the at least one floating unit is aligned with the at least one connection point. The bendable connection element is threaded through the clamping unit of the at least one floating unit.

The at least one floating unit may be designed as described before. A connection point defines a fixed position where a floating unit can be stored. The platform may include for each floating unit a separate connection point. When a floating unit is located at a connection point the first interface of the floating unit and the additional interface of the connection point may be connected so that energy or any working fluid for driving or operating the floating unit can be transferred from one interface to the other interface. For example, a fluid can be transferred from one interface to the other interface for adjusting the gas volume of the envelope. The gas volume may be increased or decreased.

The bendable connection element may be threaded through the clamping unit in such a way that the floating unit including the clamping unit may be removed from the bendable connection element, for example to replace a damaged floating unit by another. The floating unit may also be moveable along the bendable connection element when the clamping unit is in the released state without dropping down from the bendable connection element.

The additional interface may comprise an additional fluidic interface that may include a bore and a sealing wherein the sealing may be moveable along the bore between a retracted position and a sealing position.

When the sealing is in the retracted position the floating unit may be stored at a connection point without damaging the sealing. After the floating unit was stored at the connection point the sealing may be moved into the sealing position to prevent a leakage between the first fluidic interface and the additional fluidic interface, for example in case of a little gap between the first fluidic interface and the additional fluidic interface. The bore may be connected to a reservoir, for example a gas tank, containing fluid and may be used to transfer fluid between the additional fluidic interface and the reservoir.

The sealing may be moved in the sealing position when the bore is pressurized with a fluid.

Fluid may be transferred under pressure from the bore to the envelope of the floating unit via the additional fluidic interface and the first fluidic interface for adjusting the gas volume of the envelope. The pressure of the fluid may exert a force on the sealing to move the sealing into the sealing position. I.e., there is no need for an additional actuator for moving the sealing.

The at least one floating unit may be placed at the at least one connection point and the sealing moved in the sealing position may be protruding into the first fluidic interface of the floating unit.

Thus, the sealing may prevent a leakage between the first fluidic interface and the additional fluidic interface, for example in case of a greater gap between the first fluidic interface and the additional fluidic interface.

The additional interface may include at least one additional electrical interface for connecting the first electrical interface of the at least one floating unit.

The additional electrical interface may be connectable with an energy source so that electrical energy may be supplied to the first electrical interface via the additional electrical interface. The additional electrical interface may be designed as a complementary interface in respect of the first electrical interface. In case of an inductive interface, electrical energy may be transferred contactless from the additional electrical interface to the first electrical interface. One of the both electrical interfaces may comprise a magnetic coil for transferring the electrical energy. The magnetic coil may also be used to generate a magnetic force so that one of the both electrical interfaces attracts the other one. Alternatively, the additional electrical interface may comprise a connector, a plug or pins for a mechanical connection with the first electrical interface. Optionally, the first and the additional electrical interface may be used to transfer data or signals.

The at least one additional electrical interface may be energized with electrical energy when the first electrical interface of the at least one floating unit is connected with the at least one additional electrical interface.

The first electrical interface of the at least one floating unit may be connected with the at least one additional electrical interface when the at least one floating unit is positioned at a connection point. If so, the magnetic force may attract the floating unit to the platform so that the floating unit will be hold at the connection point. Electrical energy may be transferred from the additional electrical interface to the first electrical interface for controlling or supplying the actuator of the clamping unit with electrical energy. The electrical energy may be used to switch the actuator into the released state and/or to hold the actuator in the released state so that the bendable connection element can be moved freely through the clamping unit while the floating unit is standing still at the connection point.

The supply system may include a winch for winding up the bendable connection element.

The winch may be driven by a motor. When the winch winds up the bendable connection element the at least one floating unit attached to the bendable connection element is pulled towards the at least one connection point. When the at least one floating unit has reached the connection point the first electrical interface of the at least one floating unit may be connected with the at least one additional electrical interface so that the additional electrical interface of the connection point may be energized. Then, the clamping unit will be switched into the released state so that the winch may continue to wind up the bendable connection element without pulling the at least one floating unit.

The platform may include a strain relief being in contact with the bendable connection element. The strain relief may be switchable between a reliefing state and a tensioned state. The strain relief may switch into the reliefing state when the at least one floating unit is positioned at the at least one connection point and the clamping unit of the at least one floating unit is attached to the bendable connection element being wound up by the winch.

When the floating unit was pulled to a connection point by the bendable connection element there may be a slight time delay for connecting the first and the additional electrical interface and for energizing the actuator to switch the clamping unit into the released state. During this time delay, the winch continues to wind up the bendable connection element. Thus, as long as the clamping unit isn't switched into the released state the bendable connection element may tug at the clamping unit positioned statically at the connection point so that consequently the floating unit, the winch or the bendable connection element may be damaged. But the strain relief can damp the tugging of the bendable connection element to avoid a damage by switching into the reliefing state.

The supply system may also include a rail for guiding the clamping unit of the at least one floating unit towards the at least one connection point.

The rail may have a surface the clamping unit can slide along. The rail may press the clamping unit towards the platform to bring the first electrical interface and the additional electrical interface into contact while the bendable connection element pulls the at least one floating unit to a connection point. The rail may define a track the clamping unit is guided along for centering the clamping unit over the connection point. The track of the rail may guide the clamping unit in alignment with the at least one connection point.

The supply system may also include a guidance for guiding the bendable connection element in alignment with the at least one connection point.

Thus, the bendable connection element may be stabilized against fluttering by the guidance and may pull the floating unit towards the connection point. If both, the bendable connection element and the track of the rail are in alignment with the at least one connection point the friction between the rail and clamping unit may be reduced when the clamping unit slides along the rail.

The supply system may include more than one connection point. The distance between two connection points may be adapted for a gapless positioning of the clamping units at the connection points next to each other.

In such a configuration, the floating units can be stored very compact since a clamping unit of one floating unit positioned at a connection point may be adjacent to a clamping unit of another floating unit positioned at a connection point.

The supply system may also include a base body wherein the platform is rotatably connected to the base body.

The base body may be a solid element and may be mounted on a static station or on a mobile vehicle such as an agricultural vehicle (e.g. a tractor or harvester). The platform may rotate about a vertical axis connected with the base body. Thus, the orientation of the platform may be aligned to any object as for example a section of the bendable connection element beyond the supply system that may float in any direction.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which:

FIG. 1 illustrates an agricultural vehicle having a supply system with floating units stored on;

DETAILED DESCRIPTION

Figure 1:
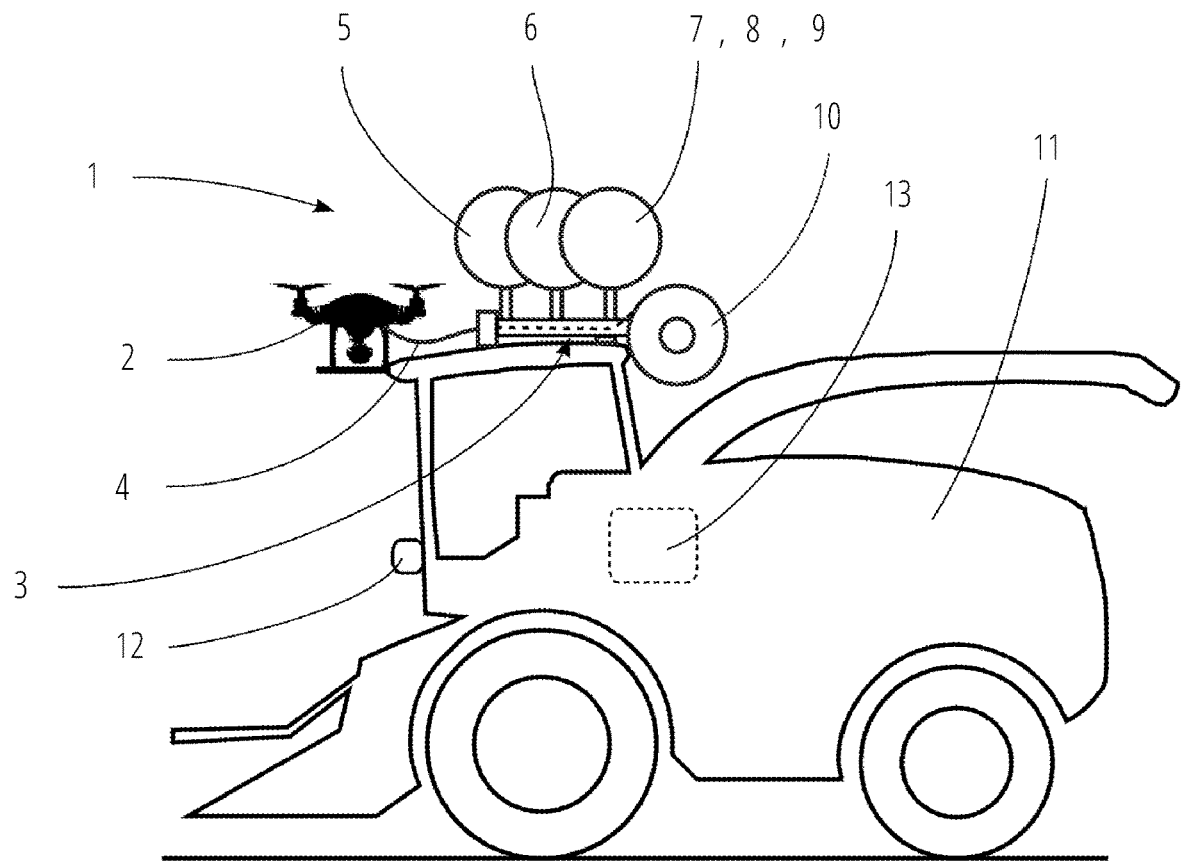
Figure 2:
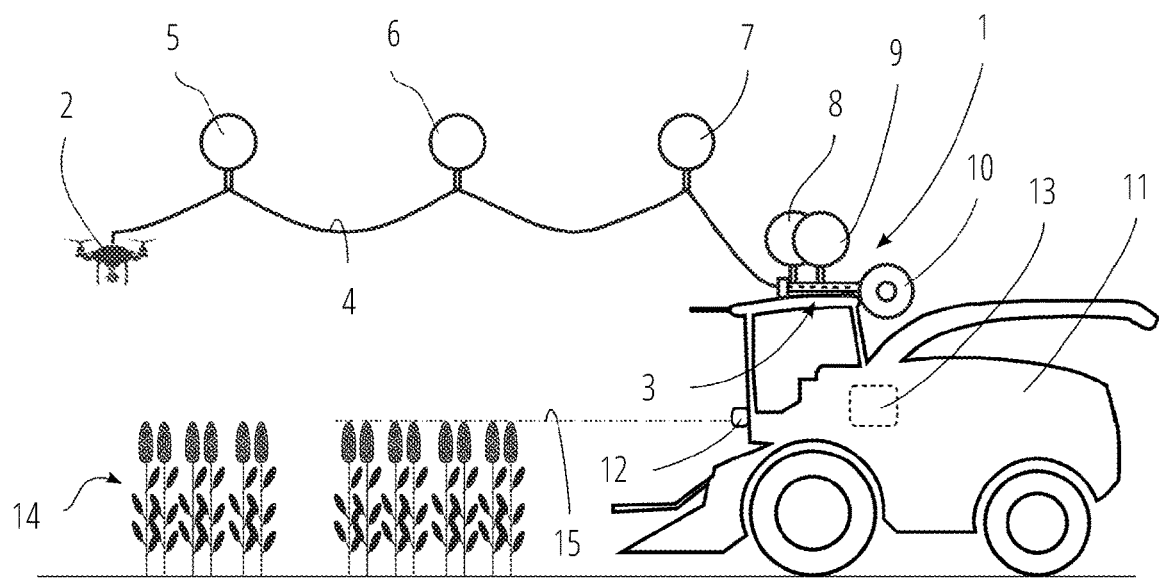
FIG. 2 illustrates an agricultural vehicle having a supply system with floating units floating in the air.

FIG. 1 and FIG. 2 show a supply system 1. The supply system 1 comprises a platform 3, a vehicle 2, a bendable connection element 4 having one end connected with the vehicle 2 and another end connected with the platform 3 and at least one floating unit 5, 6, 7, 8 and 9 for lifting the bendable connection element 4, a winch 10 for winding or unwinding of the bendable connection element 4 and a control unit 13. Vehicle 2 may be a drone. The platform 3 of the supply system 1 is mounted on a base body 47 designed as a roof of an agricultural vehicle 11. The base body 47 comprises a vertical axis about which the platform 3 is rotatably connected to the base body 47 (see FIG. 5). The agricultural vehicle 11 may be of any type as for example a tractor or a harvester. The vehicle 2 is placed on the roof of the agricultural vehicle 11. The agricultural vehicle 11 comprises a sensor 12 for determining a height 15 of an obstacle 14 in front of the agricultural vehicle 11. The obstacle 14 may be crop to be harvested by the agricultural vehicle 11. The control unit 13 is integrated in the agricultural vehicle 11. Alternatively, the control unit 13 can be integrated in the supply system 1. The control unit 13 receives signals from the sensor 12 and is configured to control the components of the supply system 1. Additionally, the control unit 13 may be configured to control also components of the agricultural vehicle 11 such an engine.

As can be seen in FIG. 1, the floating units 5 to 9 are stored on the platform 3, the bendable connection element 4 is wound up by the winch 10 and vehicle 2 is placed on the roof of the agricultural vehicle 11. Each floating unit 5 to 9 may be filled with a fluid, such as helium, to generate a buoyant force so that the floating units 5 to 9 may float and carry the bendable connection element 4 in the air. In contrast, FIG. 2 shows the vehicle 2 flying in front of the agricultural vehicle 11. The vehicle 2 connected with the bendable connection element 4 has unwound the bendable connection element 4 partly from the winch 10. Three floating units 5, 6 and 7 attached to the bendable connection element 4 were pulled out of the platform 3 together with the bendable connection element 4 and float in the air for lifting the bendable connection element 4 over the height 15 of the obstacle 14. The other floating unit 8 and 9 are still stored on the platform 3.

Figure 3:
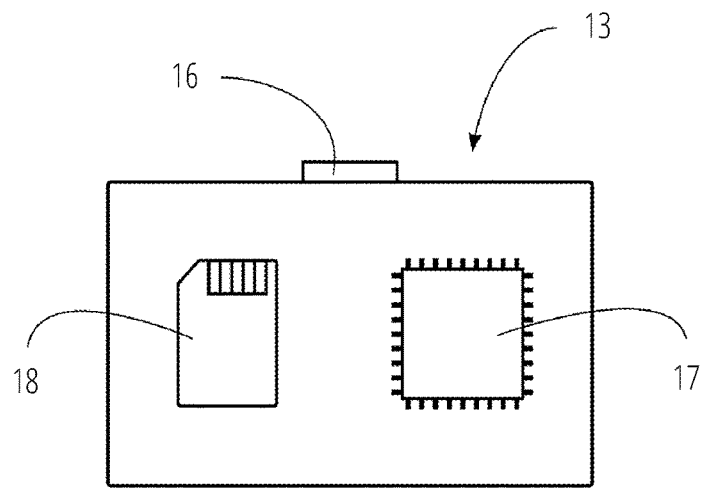
FIG. 3 illustrates a control unit.

FIG. 3 shows the control unit 13 comprising an interface 16, a controller 17 and a memory 18. The control unit 13 may receive and send signals or data via the interface 16. The interface 16 may be a wireless interface or a connector. The controller 17 may store the data or signals received by the control unit 13 in the memory 18. The memory 18 may contain additional data or executable programs, for example in terms of a computer-implemented method, that may be retrieved, processed or carried out by the controller 17. Data or signals resulting from the processing of data or signals or from the execution of a program may be stored to the memory 18 or sent to the interface 16 by the controller 17.

Figure 4:
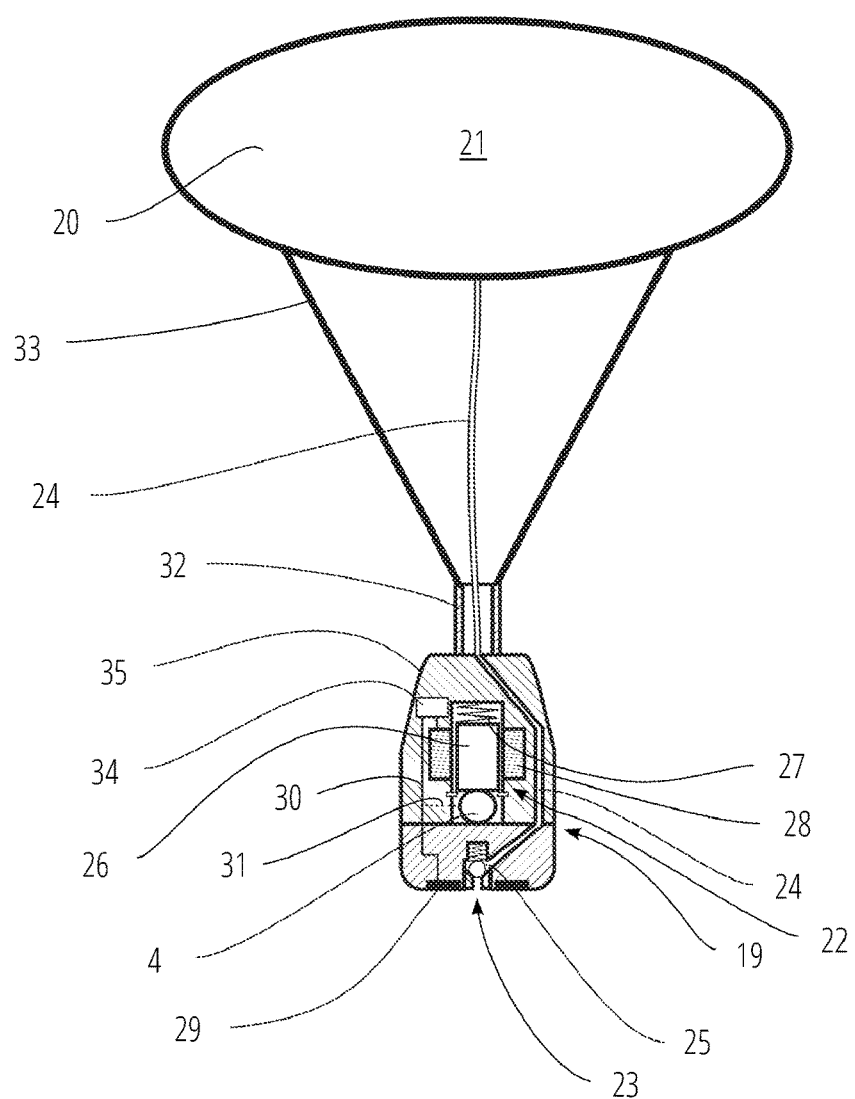
FIG. 4 illustrates a floating unit.

FIG. 4 shows any one of the at least one floating units 5 to 9. The floating unit comprises a clamping unit 19 switchable between a fixed state for attaching the floating unit to the bendable connection element 4 and a released state for detaching the floating unit from the bendable connection element 4. The floating unit also comprises an envelope 20 for enclosing a gas volume 21. As mentioned above, the envelope 20 may be filled with a fluid, such as helium, to generate a buoyant force so that the floating unit may float in the air. A rope 33 connects the envelope 20 with the clamping unit 19. The rope 33 is guided in a protective sleeve 32 to avoid a damage of the rope 33.

The clamping unit 19 comprises an actuator 22 configured to switch into the released state when the actuator 22 is energized with electrical energy and to switch into the fixed state when the actuator 22 is deenergized. The actuator 22 is connected with a first electrical interface 29 via a power line 30 and may be energized by an external power supply connected to the first electrical interface 29. Optionally, the actuator 22 may be connected to the bendable connection element 4 via a power line 31 and may be energized by a power supply connected with the bendable connection element 4. Alternatively, the first electrical interface 29 may receive energy by inductive loading via the current/voltage passing through the bendable connection element 4. In addition, the actuator 22 is connected to an internal battery 34 integrated in the clamping unit 19 and connected to the power line 30. The battery 34 may energize the actuator 22 if needed.

The actuator 22 comprises a piston 26 axially movable housed in the clamping unit 19 and a mechanical spring 27 forcing the piston 26 towards the bendable connection element 4. The actuator 22 also comprises a solenoid 28. In the released state, the solenoid 28 is energized to retract the piston 26 back from the bendable connection element 4. Thus, the clamping unit 19 may be moved along the bendable connection element 4. In the fixed state, the solenoid 28 is deenergized so that the mechanical spring 27 presses the piston 26 against the bendable connection element 4 to cause a friction force for clamping the bendable connection element 4 in the clamping unit 19. The clamping unit 19 can also switch automatically into the fixed state in case of a loss of electrical energy due to the spring force.

The clamping unit 19 also comprises a first fluidic interface 23 and a conduit 24 connecting the first fluidic interface 23 and the envelope 20 for supplying the gas volume 21 with a fluid such as helium. The first fluidic interface 23 comprises a check valve 25 to avoid a loss of fluid draining out of the first fluidic interface 23. The detailed working principle of the first fluidic interface 23 will be described later on.

As can also be seen in FIG. 4, the clamping unit 19 comprises a tapering 35 at the top of the clamping unit 19. The shape of the clamping unit 19 is rotationally symmetric.

Figure 5:
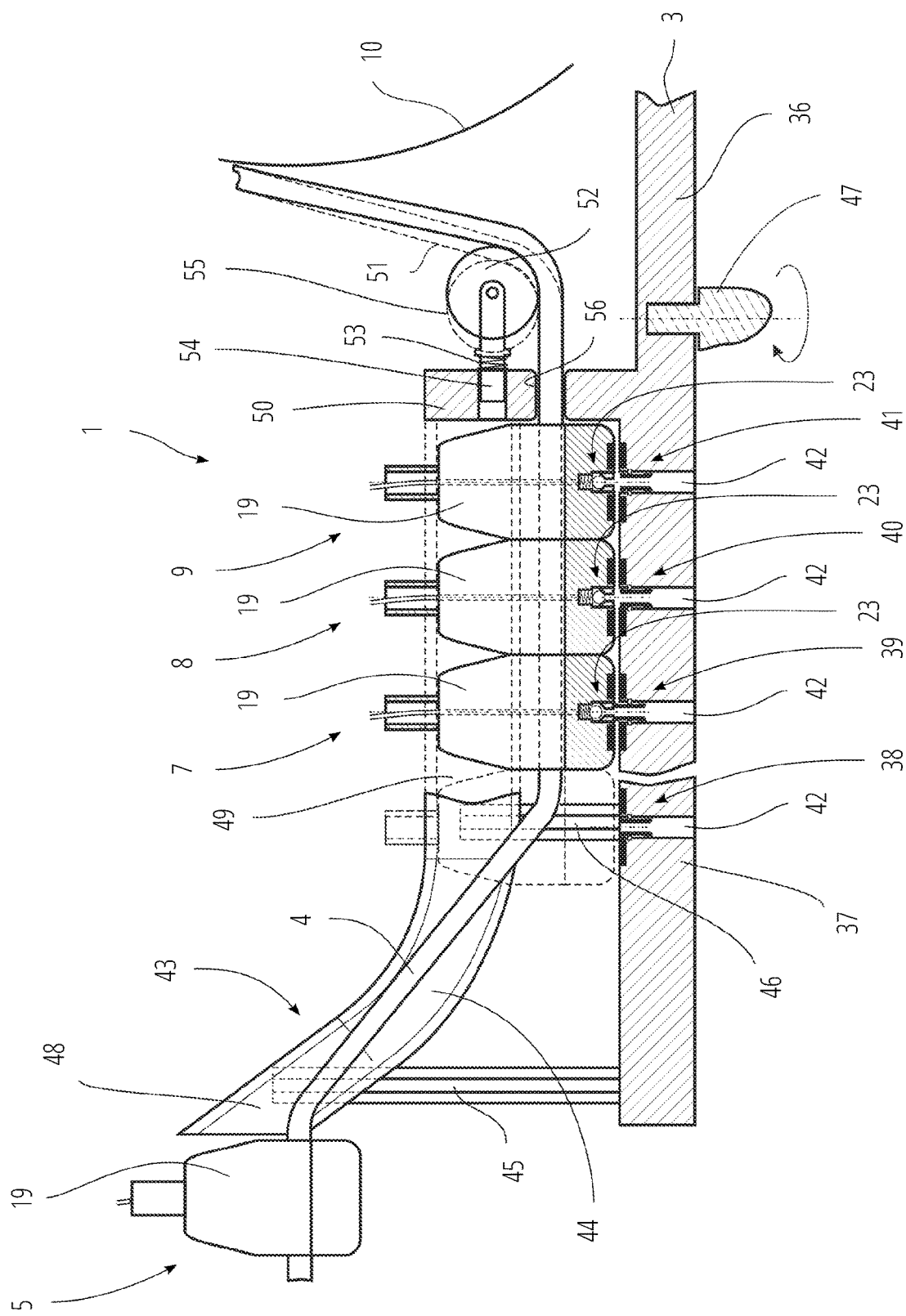
FIG. 5 illustrates a supply system for floating units.

FIG. 5 shows the platform 3 of the supply system 1 in more detail. The platform 3 comprises an one-piece elongated part 36, 37 and several connection points 38 to 41 each for storing one of the at least one floating units 5 to 9. For example, floating unit 7 is stored at connection point 39, floating unit 8 is stored at connection point 40 and floating unit 9 is stored at connection point 41 while floating unit 5 is still floating in the air. Additional connection points may be integrated in the platform 3 between connection point 38 and connection point 39 for additional floating units as for example floating unit 6. To indicate that additional connection points may be available the elongated part 36, 37 is illustrated interruptedly in FIG. 5.

Figure 6:
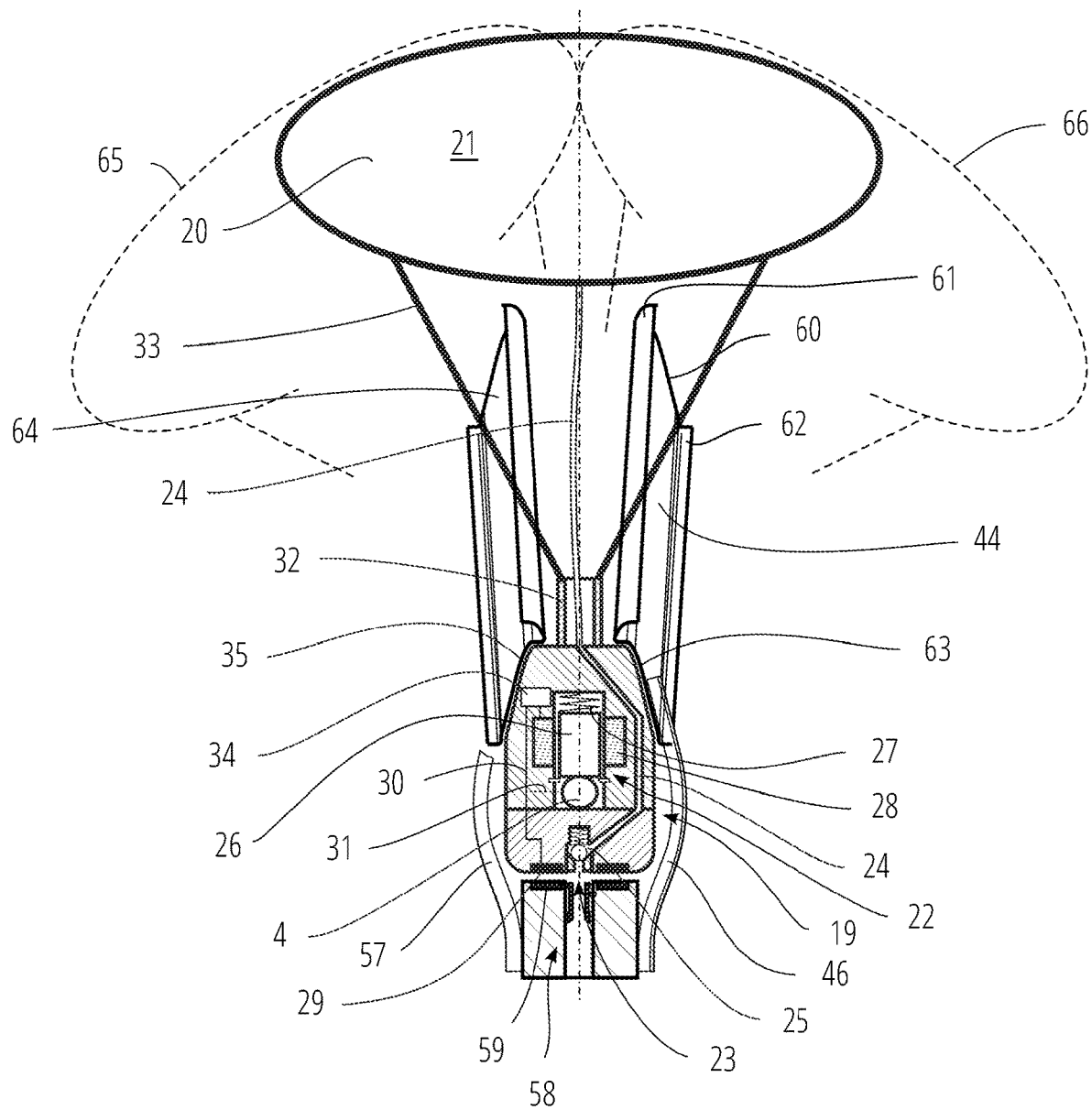
FIG. 6 illustrates an cross-sectional view of a floating unit and a platform.
Figure 7:
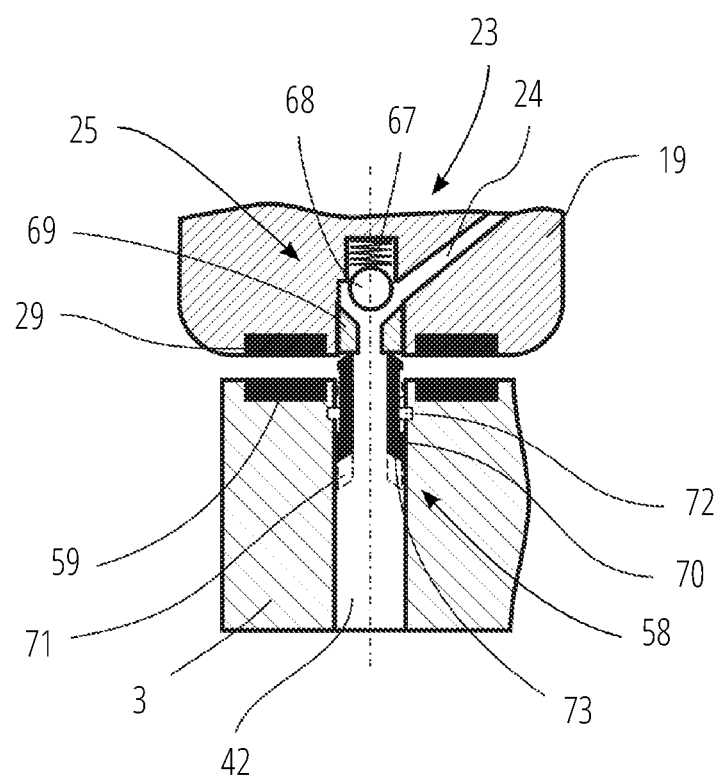
FIG. 7 illustrates a detailed view of fluidic and electrical interfaces.

Each connection point 38 to 41 comprises an additional electrical interface 59 and an additional fluidic interface 58 as can be seen in FIG. 6 and FIG. 7 for connecting the first electrical interface 29 and the first fluidic interface 23 of a floating unit positioned at one of the connection points. The first electrical interface 29 and the additional electrical interface 59 are designed as an inductive electrical interface so that energy may be transferred from one interface to the other even if a gap is between the two interfaces. I.e., the first electrical interface 29 and the additional electrical interface 59 may be used as an inductive charging interface to charge the battery 34 of a clamping unit 19. Both interfaces may also be used to transfer signals, e.g. to control the actuator 22 of the clamping unit 19 or to control the battery 34.

For storing floating unit 5 at the connection point 38 analogously to the floating unit 7, 8 or 9 the winch 10 is driven to wind up the bendable connection element 4. The bendable connection element 4 is guided above the connection points 38 to 41 so that each floating unit 5 to 9 can be pulled to a connection point. An extension 50 of the platform 3 comprises a guidance 56 through which the bendable connection element 4 is guided to keep the bendable connection element 4 aligned with the connection points. The bendable connection element 4 moves freely through each clamping unit 19 of the floating units 7 to 9 already stored at the platform 3 since these clamping units 19 are in the released state. Instead, clamping unit 19 of the floating unit 5 is in the fixed state and is pulled by the bendable connection element 4 in direction to the connection point 38.

As can be seen in FIG. 5, the floating unit 5 approaches a rail system 43 of the platform 3. The rail system 43 is also shown in FIG. 6 in a cross-sectional view. It comprises a left rail 64 and a right rail 44 for guiding the clamping unit 19 of the floating unit 5 towards the connection points. The rails are formed of pressed steel metal. Pillars are provided to position the rails relative to platform 3. As best seen in FIG. 5, the left rail 64 is fixed to the platform 3 by means of a left pillar 57 and the right rail 44 is fixed to the platform 3 by means of a right pillar 46 at a first area. Further pillars are indicated with right pillar 45 for connection with the right rail 44 while pillar 57 and further rails for connection of a left rail 64 are omitted for clarity reasons. The left and right rails 44 and 64 may be connected to the pillars by screws or by a weld joint. In addition, the left and right rails 44 and 64 are fixed to the extension 50 of the platform 3.

Left and right rails 44 and 64 are spaced apart so that the clamping unit 19 of each floating unit 5 to 9 can slide therebetween. The left and the right rail 44 and 64 comprise an intermediate portion 49 having a first profile 63 and a catching portion 48 having a second profile 60. The profiles can be seen in FIG. 6. The intermediate portion 49 extends horizontally from the extension 50 to the pillars 46, 57 positioned close to the connection point 38. Thus, the intermediate portion 49 provides a correct positioning of the clamping units 19 at their connection points.

The intermediate portion 49 then extends into the catching portion 48 from the pillar 46 to the pillar 45 on the right hand side and from the pillar 57 to another pillar opposite to the pillar 57 on the left hand side. The first and second profile 60, 63 are adapted to the shape of the clamping units 19. The first profile 63 matches with the tapering 35 of the clamping units 19 with an offset of about 1 mm prohibiting that any clamping unit 19 of a floating unit may escape upwards. Along the catching portion 48, the first profile 63 extends into a second profile 60. The second profile 60 is of a similar shape as the first profile 63 having a rounded contour 61 and a rounded leg 62 with the major difference that the profile 60 is widened to enable the clamping unit 19 of the approaching floating unit 5 to enter the rail system 43 even with a slight offset. I.e., the distance between the left and right rail 44 and 64 is greater in the area of the catching portion 48 than in the area of the intermediate portion 49 so that the second profile 60 matches also with the tapering 35 but with a much greater offset than 1 mm. The rotationally symmetric geometry of the clamping units 19 enables catching and/or centering of the clamping units 19 within the rail system 43 independent of any vertical rotation of the clamping units 19. The rounded contour 61 of the left and right rail 44 and 64 opening upwards to the top enables that the protective sleeve 32 of the floating unit can pass. The protective sleeve 32 keeps the rope 33 distant of rail system 43 to avoid that the rope 33 is not unintentionally entangled with one of the rails 44 or 64.

Instead of a fixed connection between the catching portion 48 and the intermediate portion 49, the catching portion 48 may be rotatable in a horizontal transvers direction to enable the adaption to different operating height. Thereby it can be prohibited that the catching portion 48 is catching an envelope 20 instead of a clamping unit 19 of a floating unit.

While the winch 10 winds up the bendable connection element 4 the floating unit 5 is pulled in a horizontal and vertical direction towards the connection point 38 and the clamping unit 19 of the floating unit 5 will be caught by the catching portion 48 of the rail system 43. Then, the clamping unit 19 will be guided by the rails 44 and 64 and will slide between the left rail 64 and the right rail 44 of the rail system 43. The bendable connection element 4 pulls the floating unit 5 until the floating unit 5 reaches the next free connection point, here connection point 38. The shape of the rail system 43 guides the clamping unit 19 of the floating unit 5 downwards so that the clamping unit 19 of the floating unit 5 will be aligned with the connection point 38 of the platform 3. Thus, the first interface of the clamping unit 19 will be correctly positioned relatively to the additional interface of the connection point 38. With both the first and the additional interfaces aligned with each other, the connection of the electrical and fluidic interfaces can be provided as explained below so that the first fluidic interface 23 of the floating unit 5 will be connected to the additional fluidic interface 58 of the connection point 38 and that the first electrical interface 29 of the floating unit 5 will be connected to the additional electric interface 59 of the connection point 38.

When the floating unit 5 is located at the connection point 38 similar to the other floating units 7 to 9 located at their corresponding connection points 39 to 41 the first electrical interface 29 of the floating unit 5 will be energized by the additional electrical interface 59 of the connection point 38. The electrical energy will then be transferred from the first electrical interface 29 to the actuator 22 of the clamping unit 19 of the floating unit 5 to switch the clamping unit 19 from the fixed state to the released state so that the bendable connection element 4 can also freely pass through the clamping unit 19 of the floating unit 5 analogously to the other floating unit 7 to 9 stored at the platform 3.

When the floating unit 5 is located at the connection point 38 the clamping unit 19 of the floating unit 5 leans against the adjacent clamping unit 19 of the floating unit 7 and is not able to move further with the bendable connection element 4 winded up by the winch 10. But there may be a slight time delay between the positioning of the clamping unit 19 of the floating unit 5 at the connection point 38 and the switch of clamping unit 19 into released state. I.e., the clamping unit 19 of the floating unit 5 being still in the fixed state blocks the movement of the bendable connection element 4 during the time delay so that the bendable connection element 4 is tightened and changes its routing as indicated by the dotted bendable connection element 51. Thus, the bendable connection element 4 presses against a strain relief 52 arranged between the extension 50 and the winch 10 as can be seen in FIG. 5. The strain relief 52 comprising a slider 54 mounted horizontally moveable in the extension 50 and a roller biased by a spring 53 against the bendable connection element 4 is switchable between a tensioned state and a reliefing state. In the tensioned state the spring 53 presses the bendable connection element 4 with the roller towards the winch 10. In the reliefing state the strain relief 52 is retracted by the bendable connection element 4 so that the roller changes its position to a roller position 55. The retraction of the strain relief 52 enables that a short part of the bendable connection element 4 can still be wound up by the winch 10 until the clamping unit 19 of the floating unit 5 has switched into the released state. After the clamping unit 19 releases the bendable connection element 4 the spring 53 presses the strain relief 52 to the position of the tensioned state again. So, the winch 10 wouldn't be interrupted winding up of the bendable connection element 4 even when a floating unit is positioned at a connection point and thereby blocks the movement of the bendable connection element 4 for a short moment. In addition, a damage caused by the blocked bendable connection element 4 can be prevented.

The floating unit 5 can be fluidically connected to the connection point 38 analogously to the other floating units 7 to 9 already stored at the platform 3 when the floating unit 5 is stored at the platform 3. The process of fluidically connecting a floating unit to the platform 3 is for all floating units 5 to 9 the same and will be explained now by way of example of FIG. 6 and FIG. 7.

The floating unit shown in FIG. 6 may be any one of the floating units 5 to 9 stored at one of the connection points 38 to 41 of the platform 3. FIG. 7 shows a lower part of the clamping unit 19 in more detail comprising the first fluidic interface 23 and the first electrical interface 29 of the floating unit shown in FIG. 6 as well as the additional fluidic interface 58 and the additional electrical interface 59 of the connection point at which the floating unit of FIG. 6 is stored at.

The first fluidic interface 23 is connected with the conduit 24 and comprises the check valve 25 including a seat 69 and a closing member 68 actuatable by a valve spring 67. The valve spring 67 biases the closing member 68 towards the seat 69 to block the conduit 24. In addition, the pressure of the fluid within the envelope 20 may press the closing member 68 towards the seat 69. The closing member 68 is designed as a ball and the seat 69 is inclined so that the ball is pressed against the seat 69 to avoid a leakage and a reverse flow of fluid coming through check valve 25 from the envelope 20 of the floating unit.

The additional fluidic interface 58 comprises a bore 42 and a sealing 70. The sealing 70 is slideably inserted in the bore 42 and can be moved between a sealing position and a retracted position 71 as indicated with a dotted line. The bore 42 is connected to a fluid supply unit comprising a reservoir of fluid for supplying a fluid such as helium. The control unit 13 may control the fluid supply unit to pump or to draw fluid through the bore 42.

The interface 16 of the control unit 13 is connected with the additional electrical interface 59 and detects when the first electrical interface 29 of the clamping unit 19 of the floating unit is connected with the additional electrical interface 59 to determine that the floating unit is stored at the connection point in an adequate position for starting the fluid supply process.

When the floating unit is stored at the connection point the first fluidic interface 23 and the additional fluidic interface 58 can be sealed with each other so that a leakage free transfer of fluid from one fluidic interface to the other is possible. Then, the control unit 13 controls the fluid supply unit to pump fluid from the reservoir to the bore 42. The fluid in the bore 42 presses against the sealing 70 being in the retracted position 71 to move the sealing 70 towards the first fluidic interface 23 of the clamping unit 19 so that the sealing 70 is pressed against a part of the clamping unit 19, here the seat 69. Optionally, the sealing 70 may protrude into the first fluidic interface 23. Then, the sealing 70 is in the sealing position and prevents a leakage between the first fluidic interface 23 and the additional fluidic interface 58. The sealing 70 may be retained by a circlip 72 which engages in a circumferential groove in the bore 42.

The fluid coming from the bore 42 is transferred from the additional fluidic interface 58 to the first fluidic interface 23 and presses against the closing member 68 of the check valve 25. When the pressure within the bore 42 is high enough the fluid compresses the valve spring 67 and opens the check valve 25 so that the fluid is pressed into the conduit 24. The pressure transfers the fluid through the conduit 24 into the envelope 20 of the floating unit (see FIG. 6). I.e., bore 42, conduit 24 and the envelope 20 are fluidically connected so that fluid may be added or released for adjusting the gas volume 21 of the envelope 20. The control unit 13 may determine the pressure of the fluid to control the amount of fluid to be transferred into the envelope 20 or released out of the envelope 20.

When the pressure falls below the spring force of the valve spring 67 the valve spring 67 presses the closing member 68 against the seat 69 for closing the check valve 25 again. Additionally, the sealing 70 moves back into the retracted position 71.

Since the platform 3 comprises several connection points 38 to 41 as described above multiple floating units stored at the platform 3 can be supplied with fluid simultaneously (see FIG. 5). Alternatively, instead of having multiple additional fluidic interfaces 58 to individually supply the floating units with fluid, a single additional fluidic interface may be provided which is configured to move horizontally below each floating unit stored at the platform 3. In addition, such an additional fluidic interface may also be configured to move upwards for enabling a sealing contact to a clamping unit 19 prior to supply. Electric supply may also provided in that manner.

The platform 3 is designed for a very compact storage of the floating units 5 to 9 since the distance from one connection point to another is adapted to the size of the clamping units 19. As can be seen in FIG. 5 the clamping units 19 can be stored without any gap between one and another clamping unit 19 at the platform 3. Since the envelopes 20 of the floating units are of a greater size than the clamping units 19 the envelopes 20 of each stored floating unit may swerve to a left hand position indicated by dotted line 65 or to a right hand position indicated by dotted line 66 (see FIG. 6) when multiple floating units are stored at the platform 3 (see FIG. 5).

All references cited herein are incorporated herein in their entireties. If there is a conflict between definitions herein and in an incorporated reference, the definition herein shall control.

What is claimed is:

1. A supply system for a floating unit comprising:
   a bendable connection element;
   a winch for winding up the bendable connection element;
   at least one floating unit for lifting the bendable connection element, comprising:
      a clamping unit switchable between a fixed state for attaching the floating unit to the bendable connection element and a released state for detaching the floating unit from the bendable connection element, the clamping unit comprising a first interface; and
      an envelope for enclosing a gas volume; and
   a platform comprising:
      at least one connection point for the at least one floating unit, the at least one connection point comprising an additional interface for connecting the first interface of the at least one floating unit when the clamping unit of the at least one floating unit is aligned with the at least one connection point; and
      a strain relief in contact with the bendable connection element the strain relief switchable between a reliefing state and a tensioned state,
   wherein the bendable connection element is threaded through the clamping unit of the at least one floating unit, and
   wherein the strain relief switches into the reliefing state when the at least one floating unit is positioned at the at least one connection point and the clamping unit of the at least one floating unit is attached to the bendable connection element wound up by the winch.

2. The supply system of claim 1, wherein
   the additional interface comprises an additional fluidic interface; and
   the at least one additional fluidic interface comprises a bore and a sealing moveable along the bore between a retracted position and a sealing position.

3. The supply system of claim 2, wherein the sealing is moved in the sealing position when the bore is pressurized with a fluid.

4. The supply system of claim 2, wherein
   the at least one floating unit is placed at the at least one connection point; and
   the sealing moved in the sealing position is protruding into the first fluidic interface of the floating unit.

5. The supply system of claim 1, the additional interface comprising at least one additional electrical interface for connecting the first interface of the at least one floating unit.

6. The supply system of claim 5, wherein the at least one additional electrical interface is energized with electrical energy when the first electrical interface of the at least one floating unit is connected with the at least one additional electrical interface.

7. The supply system of claim 1, comprising a rail for guiding the clamping unit of the at least one floating unit towards the at least one connection point.

8. The supply system of claim 1, comprising a guidance for guiding the bendable connection element in alignment with the at least one connection point.

9. The supply system of claim 1, comprising more than one connection point; wherein a distance between two connection points is adapted for a gapless positioning of the clamping units at the connection points next to each other.

10. The supply system of claim 1, comprising a base body wherein the platform is rotatably connected to the base body.

11. The floating unit of claim 1, comprising
    a conduit;
    wherein the first interface comprises a first fluidic interface; and
    the conduit is connected with the first fluidic interface and the envelope for supplying the gas volume with a fluid.

12. The floating unit of claim 11, wherein the first fluidic interface comprises
    a check valve comprising a seat and a closing member moveable towards the seat for sealing the seat.

13. The floating unit of claim 12, the check valve comprising a valve spring for biasing the closing member towards the seat.

14. The floating unit of claim 1, wherein the first interface comprises a first electrical interface; and
- the clamping unit comprises an actuator connected with first electrical interface for supplying the actuator with electrical energy.

15. The floating unit of claim 14, wherein the actuator is configured to switch the clamping unit into the released state when the actuator is energized with electrical energy and to switch the clamping unit into the fixed state when the actuator is deenergized.

\* \* \* \* \*